US012766563B2

(12) United States Patent
Komori et al.

(10) Patent No.: US 12,766,563 B2
(45) Date of Patent: Oct. 20, 2026

(54) ELECTRONIC COMPONENT CONVEYANCE MACHINE

(71) Applicant: TOKYO WELD CO., LTD., Tokyo-to (JP)

(72) Inventors: Taiyo Komori, Tokyo-to (JP); Haruka Tooyama, Tokyo-to (JP); Masamichi Kiuchi, Tokyo-to (JP); Yoshikazu Sasaoka, Tokyo-to (JP)

(73) Assignee: TOKYO WELD CO., LTD., Tokyo-to (JP)

( * ) Notice: Subject to any disclaimer, the term of this patent is extended or adjusted under 35 U.S.C. 154(b) by 0 days.

(21) Appl. No.: 18/923,404

(22) Filed: Oct. 22, 2024

(65) Prior Publication Data

US 2025/0128295 A1 Apr. 24, 2025

(30) Foreign Application Priority Data

Oct. 23, 2023 (JP) ................................ 2023-181798

(51) Int. Cl.
*B07C 5/36* (2006.01)
*B07C 5/344* (2006.01)

(52) U.S. Cl.
CPC .............. *B07C 5/368* (2013.01); *B07C 5/344* (2013.01)

(58) Field of Classification Search
CPC .......... B07C 5/344; B07C 5/368; B65G 47/80
USPC .......................................................... 209/573
See application file for complete search history.

(56) References Cited

U.S. PATENT DOCUMENTS

| | | | | |
|---|---|---|---|---|
| 4,406,373 A * | 9/1983 | Braden | B07C 5/344 324/759.03 |
| 9,636,713 B2 * | 5/2017 | Garcia | B07C 5/344 |
| 2009/0127070 A1 | 5/2009 | Takeuchi et al. | |

FOREIGN PATENT DOCUMENTS

| | | |
|---|---|---|
| JP | 2007-320732 A | 12/2007 |
| JP | 2011-096715 A | 5/2011 |
| JP | 2011-112553 A | 6/2011 |
| JP | 2022-508708 A | 1/2022 |
| KR | 10-2014-0059874 A | 5/2014 |

(Continued)

OTHER PUBLICATIONS

Tomoyuki; Kojima, “Work Sorting and Discharge System and Work Sorting and Discharge Method” (English Translation), Jun. 9, 2011, worldwide.espacenet.com (Year: 2011).*

(Continued)

*Primary Examiner* — Molly K Devine
(74) *Attorney, Agent, or Firm* — Birch, Stewart, Kolasch & Birch, LLP

(57) ABSTRACT

An electronic component conveyance machine includes: a conveyance table including a plurality of accommodation through holes in which electronic components are to be accommodated; a base including a plurality of air discharge outlets facing the conveyance table; and a discharge unit including: a plurality of classification holes that are located on an opposite side from the plurality of air discharge outlets via the conveyance table; at least one collection path that is connected to the plurality of classification holes; and a guide unit that guides electronic components having been discharged from the plurality of accommodation through holes and having passed through the plurality of classification holes due to air discharged from the plurality of air discharge outlets, to the at least one collection path.

6 Claims, 5 Drawing Sheets

(56) References Cited

FOREIGN PATENT DOCUMENTS

| | | | |
|---|---|---|---|
| WO | WO 2014/010720 | A1 | 1/2014 |
| WO | WO 2020/081462 | A1 | 4/2020 |

OTHER PUBLICATIONS

Japanese Office Action issued in Application No. 2023-181798, dated Aug. 27, 2024.

* cited by examiner

ELECTRONIC COMPONENT CONVEYANCE MACHINE

CROSS-REFERENCE TO RELATED APPLICATIONS

This application is based upon and claims the benefit of priority from Japanese Patent Application No. 2023-181798, filed on Oct. 23, 2023; the entire contents of which are incorporated herein by reference.

TECHNICAL FIELD

The present disclosure relates to an electronic component conveyance machine.

BACKGROUND ART

As a device for conveying large quantities of electronic components, Japanese patent application publication No. 2011-96715 discloses a chip-shaped electronic component characteristic inspection classification device that inspects an electrical characteristic of chip-shaped electronic components and classifies the chip-shaped electronic components based on the inspection results. Further, International Publication No. 2014/010720 discloses a chip electronic component inspection sorting device for the purpose of preventing non-conforming chip electronic components from being mixed into a chip electronic component container and enabling easy removal of them from the chip electronic component container. Further, Japanese patent application publication No. 2007-320732 discloses an electronic component transfer device that uses compressed air to remove an electronic component from a through hole and prevents an electronic component from popping out due to residual compressed air pressure, which can improve transfer efficiency.

SUMMARY OF THE INVENTION

In the apparatuses of Japanese patent application publication No. 2011-96715, International Publication No. 2014/010720 and Japanese patent application publication No. 2007-320732 described above, a plurality of electronic components are simultaneously conveyed by a conveyance table, and each electronic component is discharged from the conveyance table at a predetermined discharge area and then sent to a subsequent stage.

The present disclosure provides an advantageous technique for sending electronic components discharged from a conveyance table toward a subsequent stage.

One aspect of the present disclosure is directed to an electronic component conveyance machine comprising: a conveyance table including a plurality of accommodation through holes in which electronic components are to be accommodated; a base including a plurality of air discharge outlets facing the conveyance table; and a discharge unit including: a plurality of classification holes that are located on an opposite side from the plurality of air discharge outlets via the conveyance table; at least one collection path that is connected to the plurality of classification holes; and a guide unit that guides electronic components having been discharged from the plurality of accommodation through holes and having passed through the plurality of classification holes due to air discharged from the plurality of air discharge outlets, to the at least one collection path.

The electronic component conveyance machine may comprise an air discharge control unit that controls discharge of air from the plurality of air discharge outlets, the discharge unit may include the plurality of collection paths and the plurality of guides associated with the plurality of collection paths, respectively, each of the plurality of collection paths may be connected to two or more classification holes, and electronic components having passed through the two or more classification holes may be guided by associated guides, and each of the plurality of guides may have one or more guide surfaces that orient electronic components having passed through the two or more classification holes toward a collection path and that are located at same distance from the two or more classification holes, respectively.

Each of the plurality of guides may have one or more guide surfaces that orient electronic components having passed through the two or more classification holes toward a collection path and that have surface angles such that electronic components having passed through the two or more classification holes enter the one or more guide surfaces at substantially the same angle of incidence.

The electronic component conveyance machine may comprise a plurality of guide lines that are connected to discharge outlets of the plurality of collection paths, respectively, and that guide electronic components sent from the plurality of collection paths through the discharge outlets, to a subsequent stage, each of the plurality of collection paths may have a collection wall on which electronic components guided by associated one or more guides land and which slopes downward toward a discharge outlet, and in each of the plurality of collection paths, electronic components on the collection wall may move under gravity toward the discharge outlet and enter a corresponding guide line through the discharge outlet.

The conveyance table may extend in a vertical direction or in a direction that is inclined with respect to both the vertical direction and a horizontal direction, and may rotate around an axis of rotation to convey electronic components housed in the plurality of accommodation through holes in a circumferential direction, and the plurality of accommodation through holes may be classified into a plurality of rows whose radial distances from the axis of rotation are different from each other and in each of the plurality of rows, the distance between accommodation through holes adjacent to each other in a circumferential direction may be constant.

The electronic component conveyance machine may comprise a plurality of air supply units that are connected to the plurality of air discharge outlets, the plurality of air supply units may be capable of supplying air to the plurality of air discharge outlets under different air pressure conditions from each other.

The electronic component conveyance machine may comprise: an inspection unit that performs an inspection of electronic components housed in the plurality of accommodation through holes; and an air discharge control unit that controls discharge of air from the plurality of air discharge outlets, the discharge unit may include: the plurality of collection paths associated with a plurality of classifications based on a result of the inspection, respectively; and the plurality of guides associated with the plurality of collection paths, respectively, two or more classification holes may be connected to each of the plurality of collection paths and electronic components having passed through the two or more classification holes may be guided by an associated guide, and the air discharge control unit may control discharge of air from the plurality of air discharge outlets according to a result of the inspection by the inspection unit in such a manner that an electronic component housed in each of the plurality of accommodation through holes passes through a classification hole connected to an associated collection path and is guided by a guide.

According to the present disclosure, it is advantageous for sending electronic components discharged from a conveyance table toward a subsequent stage.

DETAILED DESCRIPTION

One embodiment of the present disclosure is described below with reference to the drawings. In the following description, the terms "upstream" and "downstream" are based on the movement of electronic components unless otherwise noted.

Figure 1:
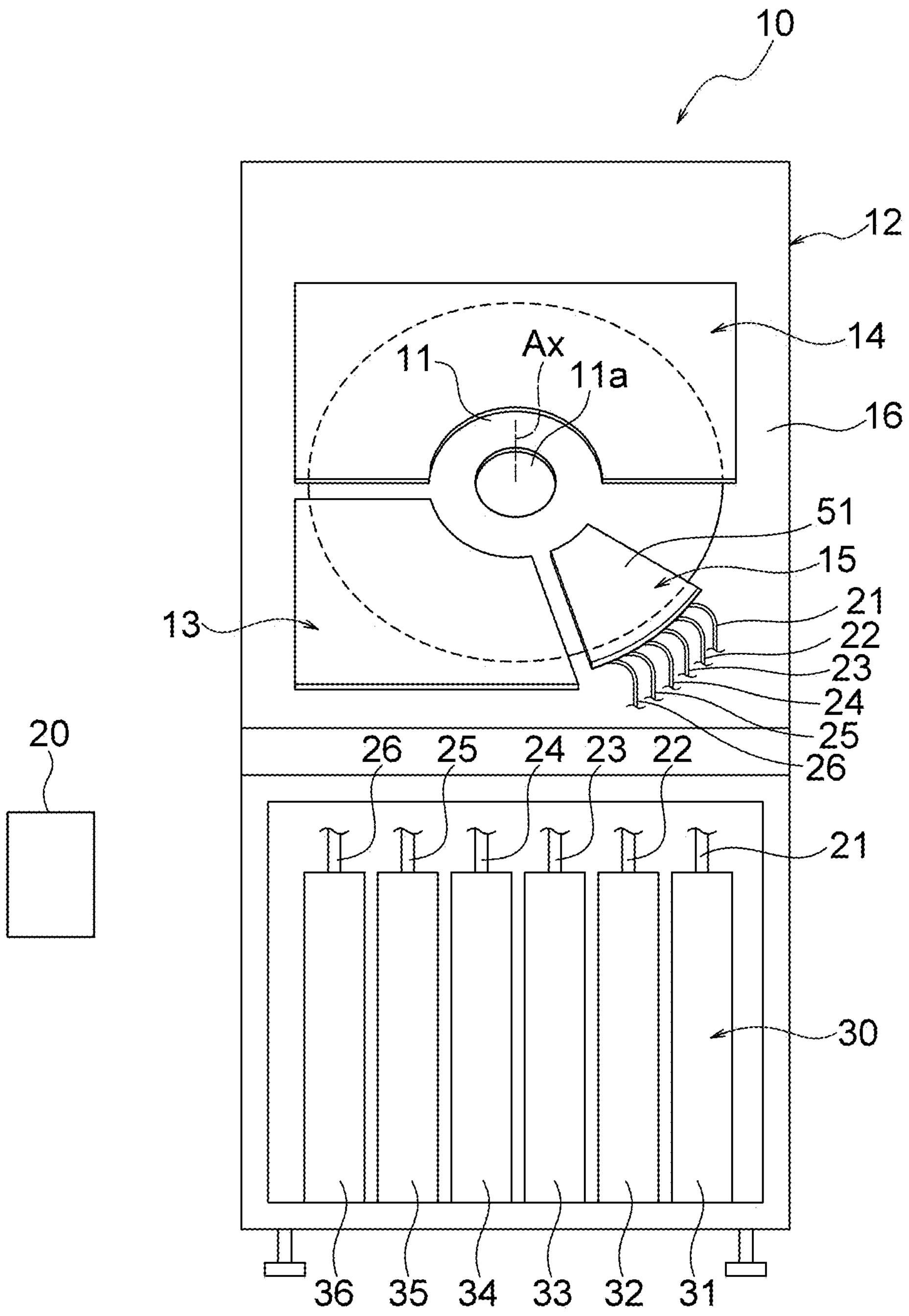
FIG. 1 is a front view of an example of an electronic component testing system (an electronic component conveyance machine)
Figure 2:
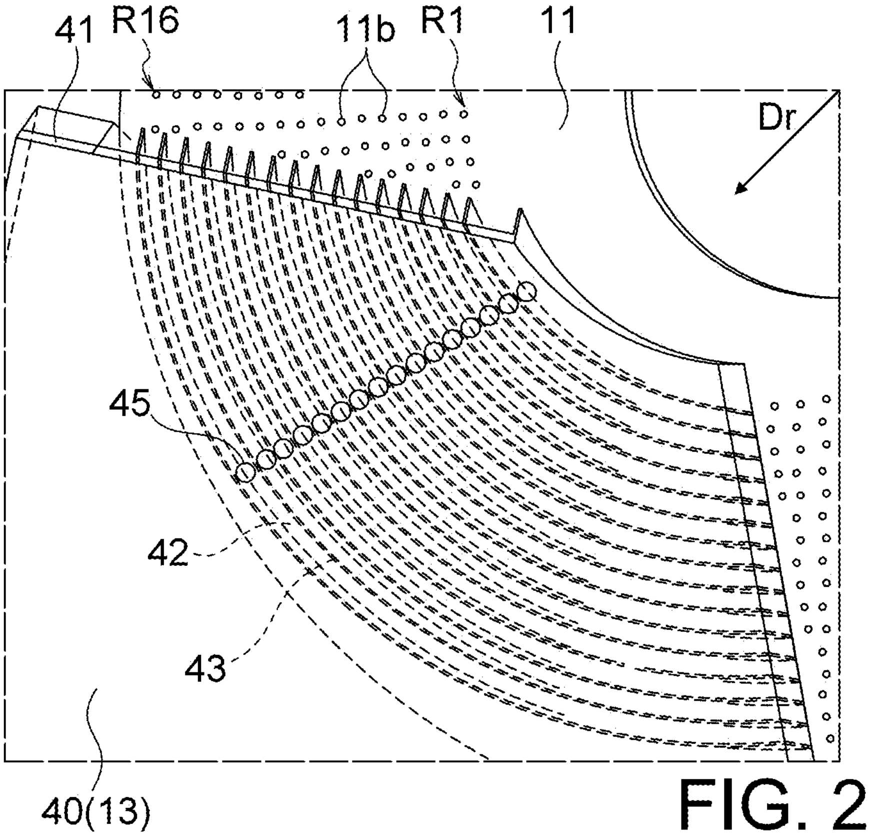
FIG. 2 is an enlarged view showing an example of a supply unit.
Figure 3:
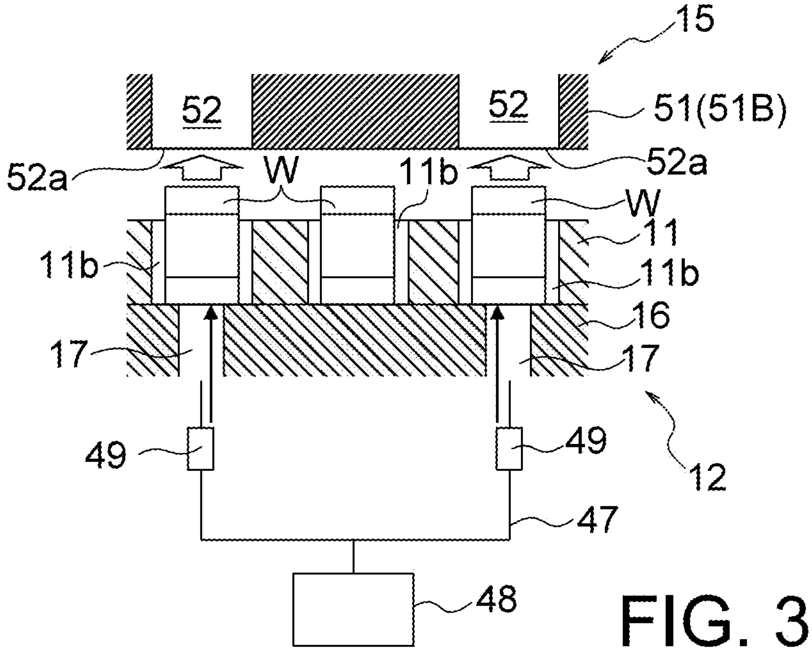
FIG. 3 is a schematic diagram showing a part of a structural example of a discharge unit, with a discharge body of the discharge unit and the base of a structure shown in a sectional view.

FIG. 1 is a front view of an example of an electronic component testing system (an electronic component conveyance machine) 10. FIG. 2 is an enlarged view showing an example of a supply unit 13. FIG. 3 is a schematic view showing a portion of a structural example of a discharge unit 15, illustrating a discharge body 51 of the discharge unit 15 and a base 16 of a structure 12 in a sectional state.

The electronic component testing system 10 shown in FIG. 1 comprises a structure 12, a control unit 20, and an index table 11, a supply unit 13, an inspection unit 14, a discharge unit 15 and a collection unit 30 that are mounted on the structure 12. The control unit 20 controls various devices that make up the electronic component testing system 10, and the index table 11, the supply unit 13, the inspection unit 14, the discharge unit 15 and the collection unit 30 operate under the control of the control unit 20.

The index table 11 is a disk-shaped conveyance table extending along the top surface of the base 16 of the structure 12, and has a plurality of pockets 11*b* (accommodation through holes) which are intended to accommodate electronic components (such as capacitors or inductors) W. The index table 11 as a whole may extend in the vertical (height) direction or may extend in a diagonal direction inclined with respect to both the vertical and horizontal directions. In the example shown in FIG. 1, the index table 11 extends in a diagonal direction as a whole so that the exposed surface (the top surface) of the index table 11 faces diagonally upward.

A drive device such as a motor (not shown in the drawings) under the control of the control unit 20 rotates a rotation shaft 11*a* intermittently, causing the index table 11, which is integrally provided with the rotation shaft 11*a*, to rotate intermittently around the axis of rotation Ax (in a clockwise direction in the example shown in FIG. 1). The intermittent rotation of the index table 11 is carried out, so that electronic components W housed in a plurality of pockets 11*b* are intermittently conveyed in a circumferential direction along a circular arc track.

The plurality of pockets 11*b* formed in the index table 11 are classified into a plurality of rows (in the present example, a first pocket row R1 to a sixteenth pocket row R16 (see FIG. 2)) that have mutually different distances from the axis of rotation Ax in the radial direction Dr. In each of the plurality of pocket rows R1 to R16, a plurality of pockets 11*b* are located on a circle centered on the axis of rotation Ax and the distance between adjacent pockets 11*b* in the circumferential direction is constant. The regular distribution of a plurality of pockets 11*b* in the index table 11 such that the plurality of pockets 11*b* are classified into a plurality of pocket rows R1 to R16 makes it possible to stably perform various processes (e.g., inspection and classification and discharge as described below) with respect to a plurality of electronic components W at one time, which contributes to ensuring high throughput of the electronic component testing system 10.

An electronic component storage unit 40 (see FIG. 2) of the supply unit 13 is provided to cover a part of the top surface of the index table 11 in an area upstream from the area where the inspection by the inspection unit 14 is performed. The electronic component storage unit 40 includes a storage unit body 41 and a plurality of storage walls 42 provided inside the storage unit body 41. The space areas between the storage walls 42 are storage sections 43 intended to store electronic components W on the index table 11, and the plurality of storage sections 43 are provided to be associated with the plurality of pocket rows R1 to R16 in the index table 11, respectively. In the example shown in FIG. 2, sixteen (16) storage sections 43 are demarcated by the storage walls 42, and the sixteen storage sections 43 extend in an arc to cover the first through sixteenth pocket rows R1 through R16, respectively.

A plurality of electronic components W are supplied from an electronic component supply unit (not shown in the drawings) to each storage section 43, and electronic components W stored in the storage sections 43 are supplied to and accommodated in the pockets 11*b* of the corresponding pocket rows R1 to R16. The electronic component supply unit is replenished with the appropriate amount of electronic components W in a timely manner via a supply feeder (not shown in the drawings).

The electronic component storage unit 40 is provided with a plurality of housing detection units 45 (in the example shown in FIG. 2, sixteen (16) housing detection units 45) that are associated with respective storage sections 43. The respective housing detection units 45 determine whether or not electronic components W are housed in pockets 11*b* of the associated pocket rows R1 to R16. Each housing detection unit 45 in the present example detects whether or not an electronic component W is contained in a pocket 11*b* located to face the housing detection unit 45 when the index table 11 is intermittently being stopped, and transmits the detection results to the control unit 20. As an example, each housing detection unit 45 may be an optical sensor including a light emitter and a light receiver provided on the back and front sides of the index table 11, or may be a reflective sensor that emits a detection light toward a pocket 11*b* located to face the reflective sensor and also receives the reflected light of the detection light.

The inspection unit 14 shown in FIG. 1 inspects an electronic component W housed in each pocket 11*b* of the index table 11 and transmits the inspection results to the control unit 20, under the control of the control unit 20. The specific content and method of the inspection performed by the inspection unit 14 are not limited. For example, the "measurement" to measure characteristic values of an electronic component W and the "screening" to detect conditions of an electronic component W for determining whether the electronic component W is good or bad (including, for example, the manifestation of a defect in an electronic component W) may be performed by the inspection unit 14 as the "inspection".

For example, the inspection unit 14 can determine the capacitance (C), the loss factor (Df) and the quality factor (Q: inverse of Df) when electronic components W are capacitors, and also can determine the leakage current of an electronic component W (and the insulation resistance calculated based on the leakage current and the applied voltage), the DC (direct-current) voltage bias capacitance, and/or the presence or absence of contact between a probe and an electronic component W based on the inrush current. Further, if electronic components W are inductors, the inspection unit 14 can determine the inductance (L), the DC resistance (Rdc) and the withstand current.

Further, the inspection unit 14 may also perform electrical tests (e.g., tests related to withstand voltage (BDV: breakdown voltage)) in which energization of an electronic component W in each pocket 11*b* is conducted while applying a thermal load to the electronic component W. As an example, an electronic component W in each pocket 11*b* may receive a DC/AC voltage that is about 2.5 times the rated voltage and that is applied by a probe of the inspection unit 14, in a state of having a high temperature of about 100° C. through 170° C. by being heated by a heater (not shown in the drawings).

The heater intended to heat an electronic component W in each pocket 11*b* can be installed in any position and in any form. For example, the heater may be provided to cover the index table 11 in at least the supply unit 13 and the inspection unit 14 of the supply unit 13, the inspection unit 14 and the discharge unit 15. In this case, an electronic component W in each pocket 11*b* of the index table 11 is heated by the radiant heat from this heater, and is placed in a state of having a desired high temperature suitable for the inspection at the time when the electronic component W receives the inspection by the inspection unit 14. The heater configured as above may adjust the amount of heat generation under the control of the control unit 20, and the control unit 20 may control the amount of heat generation of the heater based on the measurement results of a temperature sensor that measures the temperature of the index table 11.

A heat barrier (e.g., a heat insulating body, a heat insulating space and/or a cooling layer through which a cooling medium circulates) or a safety cover with a low thermal conductivity may be provided to prevent people such as operators from coming into contact with the heater or hot objects heated by the heater.

As shown in FIG. 3, the discharge unit 15 works with an air source 48 and air adjustment units 49 that supply air to a plurality of air discharge outlets 17 formed in the base 16 of the structure 12 to guide electronic components W having finished being inspected by the inspection unit 14, from the index table 11 to the subsequent stage (in the present example, to the collection unit 30).

The discharge body 51 of the discharge unit 15 is provided to cover a part of the index table 11 downstream of the area where the inspection by the inspection unit 14 is performed, and has a plurality of classification holes 52 (in the present example, 96 classification holes 52) located on the side opposite from the plurality of air discharge outlets 17 via the index table 11.

The base 16 of the structure 12 has a plurality of air discharge outlets 17 (in the present example, 96 air discharge outlets 17) facing the index table 11 in the area where the discharge body 51 of the discharge unit 15 is installed. Each air discharge outlet 17 is connected to an air source 48 via an air pipe 47 and discharges air (e.g., compressed air) supplied from the air source 48 via the air pipe 47, toward the index table 11.

The air pipe 47 in the example shown in FIG. 3 is fitted with a plurality of air adjustment units 49 (in the present example, 96 air adjustment units), such as solenoid valves, that are assigned to the respective air discharge outlets 17. Each air adjustment unit 49 can individually adjust the supply flow rate of air to the assigned air discharge outlet 17 under the control of the control unit 20. The air source 48 stores in a manifold tank high-pressure compressed air that is prepared in a factory infrastructure in a state where the high-pressure compressed air has a pressure having been reduced and adjusted to a desired discharge pressure by a regulator. The compressed air in the manifold tank of the air source 48 is supplied to each air discharge outlet 17 via the air pipe 47 and the air adjustment units 49 and is used to eject electronic components W from pockets 11*b* of the index table 11.

The number of air supply units connected to the plurality of air discharge outlets 17 is not limited, and a single air supply unit may be provided or a plurality of air supply units may be provided. In cases where a plurality of air supply units are provided, the plurality of air supply units can supply air to the plurality of air discharge outlets 17 under air pressure conditions different from each other. In such cases, the degree of freedom in equipment design can be increased.

The air supply units here may each include all elements involved in supplying air to the plurality of air discharge outlets 17. For example, the air source 48 and the air adjustment units 49 shown in FIG. 3 are included in the air supply unit. Although a single air source 48 is illustrated in FIG. 3, a plurality of air sources 48 may be provided. For example, there may be a plurality of manifold tanks each of which is equipped with an air source 48, and the plurality of manifold tanks may be connected to mutually different air discharge outlets 17.

Figure 4:
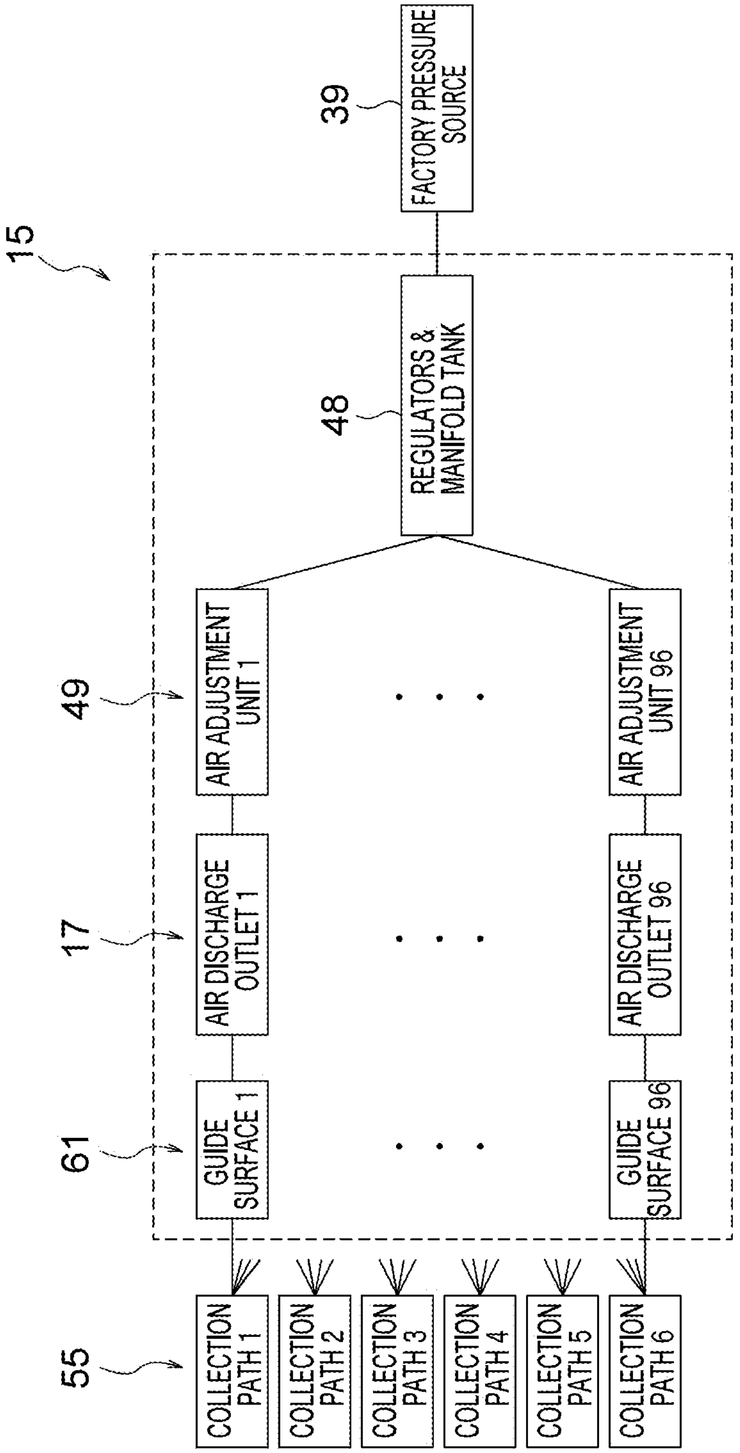
FIG. 4 is a block diagram showing an example of the discharge unit in a case where a single air source (a regulator and a manifold tank) is provided.
Figure 5:
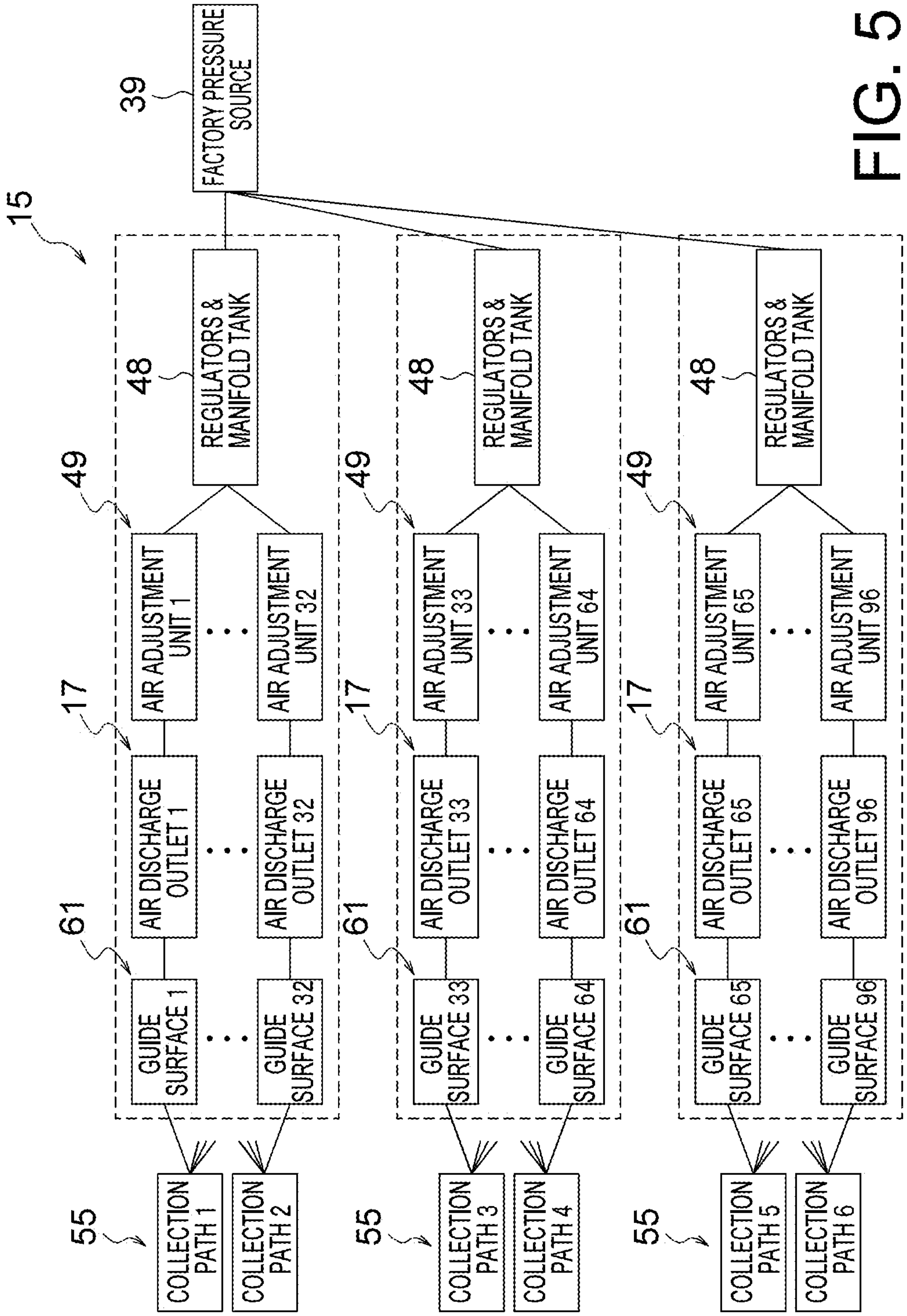
FIG. 5 is a block diagram of an example of the discharge unit in a case where a plurality of air sources (regulators and manifold tanks) are provided.

FIG. 4 shows a block diagram showing an example of the discharge unit 15 in a case where a single air source 48 (a regulator and a manifold tank) is provided. FIG. 5 is a block diagram of an example of the discharge unit 15 in a case where a plurality of air sources 48 (regulators and manifold tanks) are provided.

In the example shown in FIG. 4, all air adjustment units 49 (in the present example, 96 air adjustment units 49), all air discharge outlets 17 (in the present example, 96 air discharge outlets 17), all guide surfaces 61 (in the present example, 96 guide surfaces 61), and all collection paths 55 (in the present example, 6 collection paths 55) are connected to a single air source 48, which is connected to the factory pressure source 39. To each air adjustment unit 49, one unique air discharge outlet 17 and one unique guide surface

61 are connected, and to each collection path 55, 16 unique air adjustment units 49, 16 unique air discharge outlets 17 and 16 unique guide surfaces 61 are connected.

On the other hand, in the example shown in FIG. 5, all air adjustment units 49 (in the present example, 96 air adjustment units 49), all air discharge outlets 17 (in the present example, 96 air discharge outlets 17), all guide surfaces 61 (in the present example, 96 guide surfaces 61) and all collection paths 55 (in the present example, 6 collection paths 55) are connected to a plurality of air sources 48 (in the present example, 3 air sources 48) that are connected to the factory pressure source 39. To each air source 48, 32 unique air adjustment units 49, 32 unique air discharge outlets 17, 32 unique guide surfaces 61 and 2 unique collection paths 55 are connected. The fact that one unique air discharge outlet 17 and one unique guide surface 61 are connected to each air adjustment unit 49 and that 16 unique air adjustment units 49, 16 unique air discharge outlets 17 and 16 unique guide surfaces 61 are connected to each collection path 55, is common to the discharge unit 15 in FIG. 4 and the discharge unit 15 in FIG. 5.

As described below, it is preferable that the flying distance of an electronic component W between a plurality of guide surfaces 61 (16 guide surfaces 61) and a plurality of air discharge outlets 17 (16 air discharge outlets 17) assigned to each collection path 55 should be set to the same value as each other. In this case, the design of the discharge unit 15 is required to be performed in consideration of the arrangement of devices while considering that the air adjustment units 49, the air discharge outlets 17 and the guide surfaces 61 associated with an individual air source 48 (see dotted lines in FIGS. 4 and 5) are regarded as one unit. Therefore, compared to the discharge unit 15 in FIG. 4 where only a single air source 48 is provided, the discharge unit 15 in FIG. 5 where a plurality of air sources 48 are provided offers more flexibility in equipment design.

The control unit 20 also acts as an air discharge control unit that controls the discharge of air from the plurality of air discharge outlets 17. Specifically, the control unit 20 controls the air source(s) 48 and the air adjustment units 49 to discharge air from the air discharge outlets 17 at the timing when electronic components W housed in pockets 11*b* are placed in positions facing corresponding air discharge outlets 17 (for example, while the index table 11 is being intermittently stopped). The air discharged from the air discharge outlets 17 causes electronic components W to be ejected from pockets 11*b* and enter corresponding classification holes 52, and then to be guided into the collection paths by the guides of the discharge unit 15 after passing through classification holes 52.

In particular, according to the present embodiment, in the discharge unit 15, a plurality of collection paths that are respectively associated with a plurality of classifications based on the results of the inspection by the inspection unit 14 and a plurality of guides that are respectively associated with the plurality of collection path are provided. The control unit 20 controls the discharge of air from the plurality of air discharge outlets 17 according to the results of the inspection by the inspection unit 14. As a result, an electronic component W housed in each pocket 11*b* is guided by a guide to a corresponding collection path after passing through a classification hole 52 that is connected to the collection path corresponding to the classification based on the inspection result.

Figure 6:
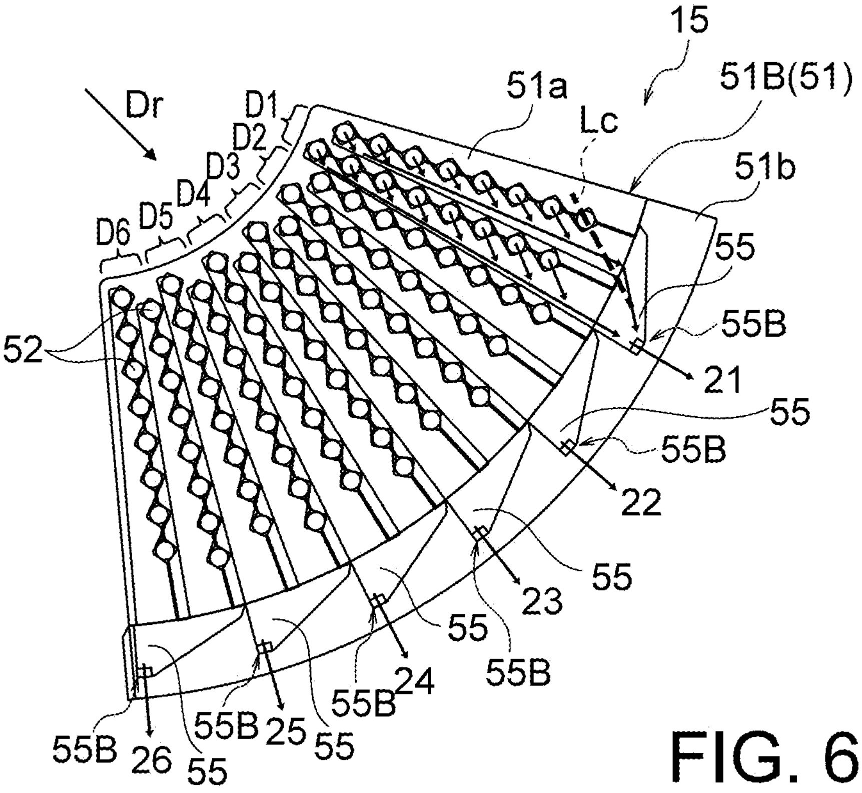
FIG. 6 is a perspective view showing the schematic structure of an example of the discharge body of the discharge unit (in particular, a second discharge body)
Figure 7:
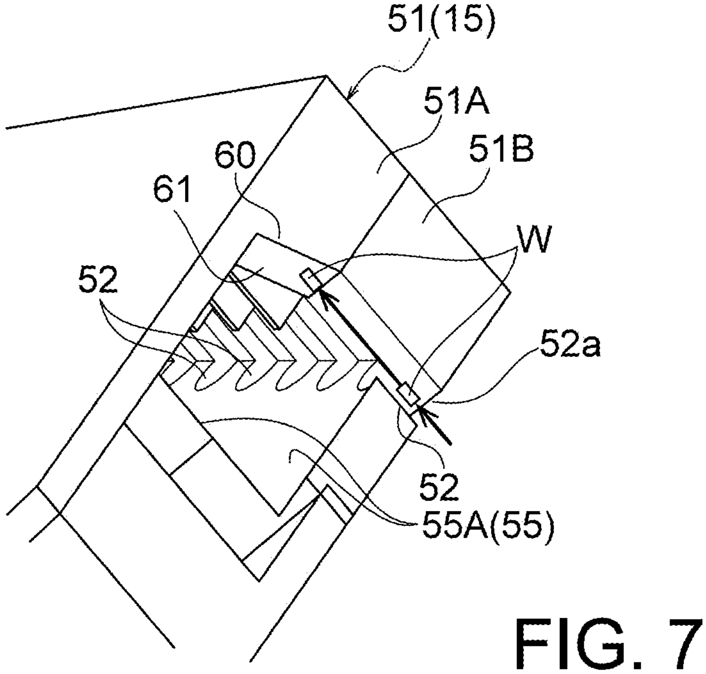
FIG. 7 is an enlarged view of the discharge body, especially showing the cut discharge body viewed from the cut surface.

FIG. 6 is a perspective view showing a schematic configuration of an example of the discharge body 51 (in particular, a second discharge body 51B) of the discharge unit 15. FIG. 7 shows an enlarged view of the discharge body 51, especially showing a state of the discharge body 51 cut with respect to a section line Lc in FIG. 6, viewed from the cut surface.

The discharge body 51 in the present example, which has a fan-form planar shape, includes: a first discharge body 51A having a decelerating wall 60; and a second discharge body 51B including the classification holes 52, and the first and second discharge bodies 51A and 51B are joined to each other to form an integrated unit. In FIG. 6, the second discharge body 51B is illustrated but the first discharge body 51A is omitted, and a discharge extension unit 51*a* extending in the radial direction Dr in the second discharge body 51B and a discharge peripheral unit 51*b* that forms the outer peripheral end surface of the discharge extension unit 51*a* are shown.

The discharge body 51 of the discharge unit 15 includes a plurality of classification sections (i.e., six classification sections: a first classification section D1 to a sixth classification section D6) provided in a circumferential direction as shown in FIG. 6. These classification sections D1 to D6 are associated with a plurality of classifications (in the present example, six classifications) based on the inspection results by the inspection unit 14, respectively, and have the same basic structure as each other.

The discharge body 51 includes, in each of the classification sections D1 through D6, a plurality of classification holes 52, a single collection path 55 that is connected to and is shared among the plurality of classification holes 52, and a decelerating wall (a guide) 60 that guides electronic components W having passed through the plurality of classification holes 52 into the collection path 55. In this manner, two or more classification holes 52 are connected to each collection path 55, and the associated decelerating wall 60 guides electronic components W having passed through the two or more classification holes 52 into each collection path 55.

The number of classification holes 52 connected to each collection path 55 corresponds to the number of rows of the pockets 11*b* formed in the index table 11, and in the example shown FIGS. 6 and 7, the number of classification holes 52 connected to each collection path 55 is "16", which corresponds to a first pocket row R1 through a sixteenth pocket row R16 of the index table 11. In particular, in the example shown in FIGS. 6 and 7, the 16 classification holes 52 are divided into two rows, each row consisting of eight classification holes 52 arranged in a straight line in the radial direction Dr. The 16 classification holes 52, divided into two rows, are staggered along the radial direction Dr and are connected to a common collection path 55.

The plurality of classification holes 52 included in each of the classification sections D1 to D6 in the discharge body 51 are respectively assigned to the pockets 11*b* of the pocket rows R1 to R16 in the index table 11. An electronic component W accommodated in each pocket 11*b* is collected through an assigned classification hole 52 in a classification section corresponding to the classification of the inspection result.

The decelerating wall 60 in each of the classification sections D1 to D6 has one or more guide surfaces 61 that orient electronic components W having passed through the corresponding 16 classification holes 52, toward the corresponding collection path 55. In the example shown in FIG. 7, a unique guide surface 61 with an optimal face angle is assigned with respect to each classification hole 52, and in each of the classification sections D1 to D6, there are a plurality of guide surfaces (16 guide surfaces) facing a plurality of classification holes 52 (16 classification holes 52). In FIG. 7, only a guide surface 61 assigned to a classification hole 52 in one column of the first classification section D1 is visible, but there are also guide surfaces 61 assigned to the classification holes 52 in the other column that are not shown in FIG. 7. One guide surface 61 may be assigned to two or more classification holes 52, and a single guide surface 61 may extend to face the plurality of classification holes 52.

The guide surfaces 61 (in the present example, 16 guide surfaces 61) in each of the classification sections D1 to D6 are located at the same distance from the corresponding 16 classification holes 52, respectively, and have surface angles such that electronic components W having passed through the corresponding 16 classification holes 52 enter the guide surfaces 61 at substantially the same angle of incidence. In particular, also between the classification sections D1 to D6 in the present example, the guide surfaces 61 are located at the same distance from the corresponding classification holes 52 and have face angles (normal directions) such that electronic components W enter the guide surfaces 61 at substantially the same angle of incidence. In particular, if the ejection direction of electronic components W from the pockets 11*b* is the same between the pockets 11*b*, all guide surfaces 61 have the same face angle (the normal direction).

The distance from each classification hole 52 to a guide surface 61 is determined based on the distance that an electronic component W travels through each classification hole 52 to the guide surface 61, and is set to 30 mm for example. In the example shown in FIGS. 6 and 7, an electronic component W enters a classification hole 52 via a classification introduction opening 52*a*, moves linearly through the classification hole 52, and then strikes a guide surface 61 and is bounced by the guide surface 61 toward a corresponding collection path 55. In this case, the distance from each classification hole 52 to a guide surface 61 can be represented by a straight line distance from the classification introduction opening 52*a* of each classification hole 52 to the guide surface 61. By making the distance from the classification holes 52 to the guide surfaces 61 the same between the plurality of classification holes 52 in this manner, the flying distance of electronic components W that have passed through these classification holes 52 until impacting the guide surfaces 61 is basically the same among the plurality of classification holes 52.

Further, by adopting a common angle of incidence of electronic components W to the guide surfaces 61, the number of bounces (the number of collisions) of the electronic components W in the discharge body 51 can be stabilized. Specifically, as the angle of incidence of an electronic component W with respect to a guide surface 61 changes, the direction of travel of the electronic component W in the discharge body 51 changes, and the number of bounces may also change. Since the damage to an electronic component W tends to increase as the number of bounces of the electronic component W increases, it is preferable that the face angle of the guide surfaces 61 should be set at an angle that is effective in reducing the number of bounces of electronic components W. However, the face angle of the guide surfaces 61 is not limited. For example, a guide surface 61 may have a face angle such that an electronic component W from each classification hole 52 enters a corresponding guide surface 61 at an angle of incidence greater than 0 degrees and less than 90 degrees (e.g., at an angle of incidence of 45 degrees).

Each collection path 55 has collection walls 55A which each slope downward toward a collection discharge outlet 55B of the collection path 55 and on which electronic components W guided by the guide surfaces 61 of the associated decelerating walls 60 land. In the example shown in FIGS. 6 and 7, each collection path 55 has two collection walls 55A with face angles (the normal directions) different from each other, and the two collection walls 55A have a tapered groove shape (tapering downward) where the two collection walls 55A gradually approach each other downward and finally meet each other. The lowest position of the collection walls 55A of each collection path 55 (i.e., the position where the two collection walls 55A meet each other) is located below the associated plurality of classification holes 52 (16 classification holes 52; in particular, the classification introduction openings 52*a*).

With each collection path 55 having the configuration described above, in each collection path 55, electronic components W on the collection walls 55A move under the influence of gravity while rolling or sliding toward the collection discharge outlet 55B, and then enters corresponding one of the guide lines 21 to 26 through the collection discharge outlet 55B. Therefore, the collection walls 55A preferably have characteristics conducive to rolling and sliding of electronic components W, and may have an antistatic surface treatment or a surface treatment that increases the slipperiness of electronic components W, for example.

A plurality of guide lines (six guide lines; the first guide line 21 through the sixth guide line 26 (see FIG. 1)) having a tubular shape and being flexible are connected to the respective collection discharge outlets 55B of the collection paths 55 of the plurality of classification sections (six classification sections) D1 through D6. Specifically, one end of the first guide line 21 is connected to the collection discharge outlet 55B of the collection path 55 of the first classification section D1, and the other end of the first guide line 21 is connected to the first collection box 31 of the collection unit 30. Similarly, one end of each of the second guide line 22 to the sixth guide line 26 is connected to the collection discharge outlet 55B of the collection path 55 of each of the second classification section D2 to the sixth classification section D6, and the other end of each of the second guide line 22 to the sixth guide line 26 is connected to each of the second collection box 32 to the sixth collection box 36 of the collection unit 30.

Thus, the first guide line 21 through the sixth guide line 26 receive electronic components W sent from the associated collection paths 55 and guide them to the collection unit 30 (the first collection box 31 through the sixth collection box 36) at the latter stage. In particular, the first to sixth guide lines 21 to 26 of the present embodiment extend continuously downward from the collection discharge outlets 55B to the collection boxes 31 to 36, and do not include any portion that extends in a direction that does not include a downward component (i.e., in the horizontal direction and in the upward direction). Therefore, electronic components W entering the guide lines 21 to 26 from the collection paths 55 fall naturally in the guide lines 21 to 26 under the influence of gravity toward the corresponding collection boxes and are finally collected in the corresponding collection boxes. The shape of the extension of each of the guide lines 21 to 26 is not limited, and each of the guide lines 21 to 26 needs not extend only in the vertical direction, and may extend diagonally downward at least in part, and for example may extend to meander at least in part.

The specific configuration of the collection boxes 31 to 36 is also not limited. For example, the collection boxes 31 to 36 may be provided with replaceable storage units in which the collected electronic components W are stored, or may be provided with cooling devices (not shown in the drawings) to cool the collected electronic components W.

An electronic component W accommodated in each pocket 11*b* of the index table 11 is collected into a corresponding collection box (into one of the first collection box 31 to the sixth collection box 36), through a classification hole 52, a decelerating wall 60 (a guide surface 61) and a collection path 55 of a classification section (i.e., one of the classification sections D1 to D6) corresponding to the classification based on the result of the inspection by the inspection unit 14.

Specifically, the control unit 20 blows air from a corresponding air discharge outlet 17 (FIG. 3) at the timing when an electronic component W in each pocket 11*b* reaches the position facing the classification hole 52 of a corresponding classification section so that the electronic component W is collected into a corresponding collection box through a classification hole 52, a guide surface 61 and the collection path 55 of a corresponding classification section and the corresponding guide line. During an electronic component W in each pocket 11*b* being in a position facing a classification hole 52 of a non-corresponding classification section, the control unit 20 does not blow air from the air discharge outlet 17 corresponding to the non-corresponding classification hole 52. As a result, the electronic component W moves together with the index table 11 toward a next classification section without entering the corresponding non-corresponding classification hole 52.

In this way, electronic components W conveyed by the index table 11 are classified and collected in the collection boxes 31 to 36 according to the results of the inspection by the inspection unit 14.

The method of manufacturing the discharge body 51 is not limited, and the discharge body 51 can be manufactured by machining or by modeling with a 3D printer. The materials used to construct the discharge body 51 are also not limited. For example, the guide surfaces 61 of the decelerating wall 60 is made of metal, resin (e.g., acrylic), leather, or any other material with properties suitable for bouncing electronic components W flying through the classification holes 52 toward the collection path 55.

Next, an example of the operation of the electronic component testing system 10 described above will be explained.

First, a large number of electronic components W are supplied from the electronic component supply unit (not shown in the drawings) to each storage section 43 of the electronic component storage unit 40 and are stored in each storage section 43. Then, while the index table 11 rotates intermittently, electronic components W are supplied to and stored in pockets 11*b* of the index table 11 from the storage sections 43. To facilitate the supply of an electronic component W to each pocket 11*b*, for example, a suction device (not shown in the drawings) may be installed behind the index table 11 (i.e., to the back side of the index table 11), and the suction device may be configured to suck an electronic component W from a storage section 43 to a pocket 11*b*.

Meanwhile, the presence or absence of electronic components W in pockets 11*b* are continuously detected by the housing detection units 45, and the detection results are transmitted from the housing detection units 45 to the control unit 20. The control unit 20 estimates the amount of electronic components W stored in each of the storage sections 43 based on the detection results of the housing detection units 45, and controls the electronic component supply unit to supply the appropriate amount of new electronic components W to each storage section 43 as necessary.

Electronic components W stored in pockets 11*b* of the index table 11 are intermittently conveyed from the supply unit 13 (the electronic component storage unit 40) to the inspection unit 14 as the index table 11 rotates intermittently. During this conveyance, an electronic component W in each pocket 11*b* may be heated by a heater (not shown in the drawings) so that the electronic component W has a temperature suitable for inspection by the inspection unit 14. An electronic component W in each pocket 11*b* is then inspected by the inspection unit 14.

An electronic component W in each pocket 11*b* is then intermittently conveyed from the inspection unit 14 to the discharge unit 15 as the index table 11 rotates intermittently. An electronic component W in each pocket 11*b* is then collected in any of the collection boxes 31 to 36 corresponding to the inspection result via the discharge unit 15 and any of the guide lines 21 to 26.

As explained above, according to the electronic component testing system 10 of the present embodiment, electronic components W housed in respective pockets 11*b* of the index table 11 are efficiently collected through the discharge unit 15 having the classification holes 52, the decelerating walls 60 and the collection paths 55. In particular, in a case where electronic components W are sent to the collection unit 30 via the guide lines 21 to 26, it is possible to efficiently collect the electronic components W from a large number of pockets 11*b* while reducing the number of guide lines 21 to 26 due to the discharge unit 15 installed between the index table 11 and the guide lines 21 to 26.

Thus, the number of guide lines 21 to 26 can be significantly reduced compared to the number of pockets 11*b* from which electronic components W are to be collected, the work of installing guide lines 21 to 26 can be made easier, and the space required to install the guide lines 21 to 26 can be reduced. In particular, one end of the respective guide lines 21 to 26 (i.e., an end where electronic components W from pockets 11*b* is introduced) is provided not with respect to the respective pockets 11*b* but with respect to the discharge unit 15 (in particular, the collection discharge outlets 55B of the collection path 55). Therefore, one end of each of the guide lines 21 to 26 can be attached to the discharge unit 15 at a wider arrangement interval than the arrangement interval of the pockets 11*b*, making it easier to install the guide lines 21 to 26 and reducing the man-hours (workload) required for the installation.

Further, electronic components W blown away from the respective pockets 11*b* of the index table 11 are properly guided by the guide surfaces 61 of the decelerating walls 60 toward the collection paths 55. In particular, since the air from the air discharge outlets 17 to blow off electronic components W from the respective pockets 11*b* only needs to have enough pressure and air volume to allow the electronic components W to reach the guide surfaces 61 through the classification holes 52 from the pockets 11*b*, the pressure and air volume of the air from the air discharge outlets 17 can be effectively reduced. As a result, the flying speed of the electronic components W is reduced, and the impact force acting on the electronic components W when they contact the decelerating walls 60 and the collection paths 55 can be reduced, reducing possible damage to the electronic components W and effectively preventing the occurrence of cracks and chips in the electronic components W.

Further, the ability to reduce the pressure and air volume of the air from the air discharge outlets 17 effectively prevents defects (such as the mixing of electronic components, which is a concern in the above-mentioned International Publication No. 2014/010720) that can occur due to the pressure and air volume of the air. According to the electronic component testing system 10 of the present embodiment, for example, "flinging up of electronic components W in the collection boxes by air" which is a concern when using air to send electronic components W to the collection boxes, can be prevented, and "residual pressure at the air discharge outlets 17 (see Japanese patent application publication No. 2007-320732)" is unlikely to occur.

Further, when the index table 11 is heated by a heater, due to being able to reduce the pressure and air volume of the air from the air discharge outlets 17, the degree of cooling of the heater and/or the index table 11 caused by the air can be suppressed, making it possible to heat the index table 11 efficiently.

Further, due to being able to reduce the pressure and air volume of the air from the air discharge outlets 17, air consumption can be reduced and fluctuations in the air pressure (the compressed air pressure) in the tanks of the air sources 48 can be reduced. As a result, the air pressure in the tanks is stabilized and air can be discharged from the air discharge outlets 17 in a highly reliable and stable manner, which in turn enhances the reliability of the handling of electronic components W in the electronic component testing system 10.

Further, by setting the distance from a classification hole 52 to a guide surface 61 to the same value among a plurality of classification holes 52, the discharge air conditions, such as the pressure and air volume of air from the air discharge outlets 17 to blow electronic components W from pockets 11*b*, can be standardized among the plurality of pockets 11*b*. Further, by setting the incident angle of an electronic component W to the assigned guide surface 61 to the same value among a plurality of classification holes 52, the guidance of electronic components W via the guide surfaces 61 to the collection paths 55 can be stabilized. This communization of the structure of the discharge body 51 between the classification holes 52 facilitates the manufacturing of the discharge body 51.

Further, since electronic components W land on the collection paths 55 after being decelerated by contacting the decelerating walls 60, the impact force that can be exerted on other electronic components W already located on the collection paths 55 can be reduced, making it possible to reduce damage that can be exerted on the other electronic components W and effectively prevent the occurrence of cracks and chips in the electronic components W.

Further, the continuous downward extension of the guideway for electronic components W including the collection paths 55 and the guide lines 21 to 26, allows the electronic components W to be guided toward the collection unit 30 using the natural fall due to gravity, effectively preventing the electronic components W from clogging in the guideway.

In the embodiment described above, no device is installed to create airflow that assists the downstream feeding of electronic components W in the collection paths 55 and the guide lines 21 to 26; however, a device creating such airflow may be installed.

Further, to reduce static electricity in the collection paths 55 and the guide lines 21 to 26, an ionizer (a static eliminator; not shown in the drawings) may be installed to provide static eliminating ions to the collection paths 55 and the guide lines 21 to 26. For example, if a blower is installed to create an airflow that assists in the downstream feeding of electronic components W in the collection paths 55 and/or the guide lines 21 to 26, a blow-type ionizer that creates an airflow containing neutralization ions (i.e., static eliminating ions) may be used as said blower.

On the other hand, other electronic component conveyance machines that are not equipped with the discharge unit 15 described above cannot achieve the function effects achieved by the electronic component testing system 10 described above that is equipped with the discharge unit 15.

For example, if guide lines are provided with respect to the respective pockets 11*b* from which electronic components W can be discharged, it is necessary to install the same number of guide lines as the number of pockets 11*b* from which electronic components W can be discharged. For example, if electronic components W can be ejected from 96 pockets 11*b* (=6 (the number of classification sections)×16 (the number of pocket rows)) as in the above-described example, it is needed to install 96 guide lines, which makes the installation of guide lines complicated and requires a large installation space for the guide lines.

Further, in this case, if the plurality of pockets 11*b* capable of discharging electronic components W are distributed over a wide area, the length and the bend conditions (e.g., the bend radius) of the guide lines to the collection unit 30 are not constant, and the discharge air conditions (such as air pressure and air volume, etc.) required to send electronic components W from the pockets 11*b* to the collection unit 30 will also vary among the guide lines. In practice, therefore, the discharge air conditions for a guide line with the most severe discharge air conditions (i.e., a guide line with the greatest air pressure and air volume required) are sometimes used in such a manner that the discharge air conditions for the other guide lines are set to match them; however, in such cases, there are concerns about possible defects that may occur due to air pressure and air volume (e.g., the mixing of electronic components or large residual pressure at air discharge outlets). Also, by setting the discharge air conditions for all guide lines to the most severe discharge air conditions, excessive energy is used to create an airflow for guide lines with relatively loose optimum discharge air conditions (i.e., guide lines with relatively low air pressure and air volume required) and thus there are also concerns that electronic components W may fling up in the collection boxes and that electronic components W may be unintentionally discharged from the collection boxes.

Further, in such a case, the extension state of the guide lines may differ greatly among the guide lines, and there are concerns that electronic components W may slow down too much in the guide lines, that electronic components W may be caused to stagnate in the guide lines and thus clog the guide lines, and that electronic components W may flow backward in the guide lines.

Further, in such a case, the guide lines are required to be installed in accordance with the opening orientation of the corresponding pockets 11*b*, and thus the direction of extension of at least a portion of the guide lines may include an upward direction component. In such cases, the discharge air conditions become more severe, and electronic components W are more likely to stagnate or backflow in the guide lines.

Further, in such a case, the number of guide lines necessarily increases in terms of ensuring efficient discharge of electronic components W; however, it is not very realistic from the standpoint of labor and cost to find the optimum discharge air conditions for each of the many guide lines and to individually set the discharge air conditions to the optimum conditions.

Variant Examples

In the example shown in FIGS. 6 and 7, a single collection path 55 is provided with respect to each of the classification sections D1 to D6, but a plurality of collection paths 55 may be provided with respect to each classification section. In this case, two or more 55 collection paths assigned to a common classification section may merge, and the merged collection path may be connected to a guide line.

It should be noted that the embodiments and variant examples disclosed in the present specification are shown as mere examples in all respects and are not to be construed as limiting. In the above-described embodiments and variant examples, omission, replacement and modification are possible in various forms without departing from the scope and intent of the appended claims. For example, the embodiments and variant examples described above may be combined in whole or in part, and the embodiments or variations that are described above may be combined with embodiments that are not described above. Further, the effects of the present disclosure described in the present specification are indicated as mere examples, and other effects may be brought about.

The technical categories embodying the technical ideas described above are not limited. For example, the above-described technical ideas may be embodied by a computer program for causing a computer to execute one or more procedures (steps) included in a method for manufacturing or using the devices described above. Further, the above technical ideas may also be embodied as a computer-readable non-transitory recording medium in which such a computer program is recorded.

The invention claimed is:

1. An electronic component conveyance machine comprising:

a conveyance table including a plurality of accommodation through holes in which electronic components are to be accommodated;

a base including a plurality of air discharge outlets facing the conveyance table;

a discharge unit including:

a plurality of classification holes that are located on an opposite side from the plurality of air discharge outlets via the conveyance table;

at least one collection path that is connected to the plurality of classification holes; and a guide unit that guides the electronic components having been discharged from the plurality of accommodation through holes and having passed through the plurality of classification holes due to air discharged from the plurality of air discharge outlets, to the at least one collection path; and a plurality of guide lines that are connected to collection discharge outlets of the plurality of collection paths, respectively, and that guide the electronic components sent from the plurality of collection paths through the collection discharge outlets, to a subsequent stage, wherein:

the air is discharged from the plurality of air discharge outlets so that the electronic components are blown to collide against the guide unit, and the guide unit decelerates and guides the electronic components to the at least one collection path as a result of collision with the electronic components; and an air discharge control unit that controls discharge of air from the plurality of air discharge outlets, wherein:

the discharge unit includes the plurality of collection paths and the plurality of guide units associated with the plurality of collection paths, respectively, each of the plurality of collection paths is connected to two or more classification holes, so that the electronic components pass through the two or more classification holes and move toward the guide units, each of the plurality of guide units has one or more guide surfaces that guide the electronic components having passed through the two or more classification holes toward each of the plurality of collection paths and that are located at same distance from the two or more classification holes, respectively, the one or more guide surfaces have surface angles such that the electronic components having passed through the two or more classification holes enter the one or more guide surfaces at the same angle of incidence, each of the plurality of collection paths has a collection wall, which has slopes downwardly extending toward the collection discharge outlet, so that the electronic components guided by one or more of the guide units land on the collection wall, and each of the plurality of collection paths is configured so that the electronic components from the collection wall move under gravity toward the collection discharge outlet and enter a corresponding guide line of the plurality of guide lines through the collection discharge outlet.

2. The electronic component conveyance machine as defined in claim 1, wherein:

the conveyance table extends in a vertical direction or in a direction that is inclined with respect to both the vertical direction and a horizontal direction, and rotates around an axis of rotation to convey the electronic components housed in the plurality of accommodation through holes in a circumferential direction, and the plurality of accommodation through holes are arrayed into a plurality of rows whose radial distances from the axis of rotation are different from each other and in each of the plurality of rows, distance between accommodation through holes adjacent to each other in a circumferential direction is constant.

3. The electronic component conveyance machine as defined in claim 1, further comprising a plurality of air supply units that are connected to the plurality of air discharge outlets, wherein the plurality of air supply units are configured to supply air to the plurality of air discharge outlets under different air pressure conditions from each other.

4. The electronic component conveyance machine as defined in claim 1, further comprising:

an inspection unit that performs an inspection of electronic components housed in the plurality of accommodation through holes; and an air discharge control unit that controls discharge of air from the plurality of air discharge outlets, wherein:

the discharge unit includes: the plurality of collection paths associated with a plurality of classifications based on a result of the inspection, respectively; and the plurality of guide units associated with the plurality of collection paths, respectively, two or more classification holes are connected to each of the plurality of collection paths and the electronic components having passed through the two or more classification holes are guided by at least one of the plurality of the guide units associated with the plurality of collection paths, and the air discharge control unit is configured to control discharge of air from the plurality of air discharge outlets according to a result of the inspection by the inspection unit so that an electronic component housed in each of the plurality of accommodation through holes passes through the classification hole connected to an associated collection path and is guided by the guide unit.

5. The electronic component conveyance machine as defined in claim 1, wherein the conveyance table is configured to rotate about an axis of rotation, the plurality of accommodation through holes are arranged in a circumferential direction and a radial direction of the conveyance table and are arrayed into a plurality of pocket rows that have different distances from the axis of rotation in the radial direction, the discharge unit includes a discharge body provided integrally, the discharge body has a plurality of classification sections, and each of the plurality of classification sections includes a plurality of classification holes, the at least one collection path and the guide unit, and the plurality of classification holes included in each of the plurality of classification sections are assigned to accommodation through holes of the plurality of pocket rows.

6. The electronic component conveyance machine as defined in claim 1, further comprising a plurality of collection containers, wherein the plurality of collection containers are connected to the plurality of guide lines so that the plurality of collection containers accommodate the electronic components sent from the plurality of collection paths through the plurality of guide lines.

* * * * *